United States Patent [19]

Laakmann et al.

[11] 4,393,506
[45] Jul. 12, 1983

[54] SEALED-OFF RF EXCITED $CO_2$ LASERS AND METHOD OF MANUFACTURING SUCH LASERS

[75] Inventors: Peter Laakmann; Katherine D. Laakmann, both of Laguna Niguel, Calif.

[73] Assignee: Walwel, Inc., San Juan Capistrano, Calif.

[21] Appl. No.: 207,576

[22] Filed: Nov. 17, 1980

[51] Int. Cl.$^3$ .................. H01S 3/22; H01S 3/03
[52] U.S. Cl. ........................ 372/59; 445/28; 445/58; 445/41; 372/64
[58] Field of Search ............ 29/25.13, 25.14, 25.15; 316/19, 24, 25; 372/33, 59, 60, 61, 64; 55/387; 427/343

[56] References Cited

U.S. PATENT DOCUMENTS

| | | | |
|---|---|---|---|
| 2,080,066 | 5/1937 | Sheppard et al. | 55/387 |
| 3,394,320 | 7/1968 | Medicus | 372/61 X |
| 3,516,010 | 6/1970 | Rasch et al. | 372/33 |
| 3,986,897 | 10/1976 | McMillan et al. | 427/343 |
| 4,017,808 | 4/1977 | Fein et al. | 372/33 |
| 4,229,709 | 10/1980 | McMahan | 372/59 |

FOREIGN PATENT DOCUMENTS 2038777 2/1972 Fed. Rep. of Germany ........ 372/60

OTHER PUBLICATIONS

Browne et al., J. of Physics E: Scientific Instruments, printed in Gt. Britain, vol. 8 1975, pp. 870–874.

*Primary Examiner*—Kenneth J. Ramsey
*Attorney, Agent, or Firm*—Michael A. Kaufman

[57] ABSTRACT

A method is disclosed for manufacturing a sealed-off RF excited $CO_2$ laser with a longer operating life. The invention, which relates to the method and the resulting laser, comprises means for stabilizing the laser gas chemistry otherwise affected by $CO_2$ dissociation, $O_2$ consumption, and outgassing of $H_2$ and $H_2O$. More specifically, the aluminum housing of the laser assembly is nickel-plated and then passivated by an oxidation technique using concentrated nitric acid. In addition, novel gettering substances, comprising either a group B metal or cellulose, are employed to adsorb hydrogen and/or water vapor to alleviate the outgassing problem.

11 Claims, No Drawings

SEALED-OFF RF EXCITED $CO_2$ LASERS AND METHOD OF MANUFACTURING SUCH LASERS

BACKGROUND OF THE INVENTION

1. FIELD OF THE INVENTION

The present invention pertains generally to $CO_2$ lasers and more particularly, to RF excited $CO_2$ waveguide lasers.

2. PRIOR ART

The principles of a waveguide gas laser were first discussed by Marcatili and Schmeltezer in a 1964 article in the Bell Systems Technology Journal, volume 43, page 1783. Waveguide operation of a helium neon laser was reported by P. W. Smith in a 1971 article in the Applied Physics Letters, volume 19, page 132. $CO_2$ waveguide lasers have been reported in a 1972 article by Bridges, Berkhardt and Smith in Applied Physics Letters, volume 20, page 403, in a 1972 article by Jensen and Tobin in the I.E.E.E. Journal of Quantum Electronics, volume QE8, page 34, in a 1972 article by Chester and Abrahms in the Applied Physics Letters, volume 21, page 576 and in a 1972 article by Berkhardt, Bridges and Smith in Optical Communications, volume 6, page 193. RF excited $CO_2$ waveguide lasers have been disclosed in a 1978 article by Lachambre, MacFarlane, Otis, and Lavigne in Applied Physics Letters, volume 32, page 652 and in U.S. Pat. No. 4,169,251 by Laakmann issued Sept. 25, 1979. Further significant improvements in RF excited $CO_2$ waveguide lasers are disclosed in U.S. patent application Ser. No. 78,343 filed Sept. 24, 1979 by the present applicants and the disclosures contained therein are incorporated herein in their entirety by reference.

In many industrial applications of $CO_2$ lasers it is highly advantageous to have a self-contained laser tube that does not require an input of gas during operation. Such sealed-off $CO_2$ lasers do not require auxillary gas cylinders and vacuum pumps and thus lend themselves more readily to portable operation. However, one of the main problems associated with sealed-off $CO_2$ lasers is that of maintaining stable long term operation despite factors which tend to destabilize the gas chemistry such as $CO_2$ dissociation, $O_2$ consumption, and outgassing.

The problem of stable long term operation of sealed-off $CO_2$ laser tubes has been the subject of extensive investigation by Witteman, reported in the following articles: 1965 Physics Letters, volume 18, page 125; 1966 Phillips Research Report, volume 21, page 73; 1966 I.E.E.E. Journal of Quantum Electronics, volume QE-2, page 375; 1967 Applied Physics Letters, volume 10, page 347; 1967 Phillips Technical Review, volume 28, page 287; 1967 Applied Physics Letters, volume 11, page 337; 1968 I.E.E.E. Journal of Quantum Electronics, volume QE 4, page 786; and 1969 I.E.E.E. Quantum Electronics, volume QE 5, page 92; and by Carbone in the following articles: 1967 I.E.E.E. Journal of Quantum Electronics, volume QE 3, page 373; 1968 I.E.E.E. Journal of Quantum Electronics, volume QE 4, page 102; and 1969 I.E.E.E. Journal of Quantum Electronics, volume QE 5, page 48. It is interesting to note that Witteman discloses a system for extending the life of sealed-off $CO_2$ laser tubes which relies on the admixture of a small amount of $H_2O$, $H_2$, or $H_2$ and $O_2$ to the standard $CO_2$ laser gas mix.

DEFINITIONS

The following defined terms are used throughout this application:

absorption: Absorption is the penetration of one substance into the inner surface of another by physio co-chemical means such as by liquid taking up molecules of a gas or vapor.

adsorption: adsorption is the adherence of the atoms, ions, or molecules of a gas or liquid to the surface of another substance called the adsorbent.

dissociation: dissociation is the process by which a chemical combination breaks up into simpler constituents such as a result of added energy.

evolution: evolution is a setting free or giving off as of gas in a chemical reaction.

getter: a getter is any substance added to a system or mixture to consume or inactivate traces of impurities such as residual gases.

outgassing: outgassing is the evolution of gases from a substance due to heating, usually at low pressures.

oxidation: oxidation herein means the reaction in which oxygen combines chemically with another substance.

passivation: passivation is the process of chemically inactivating a metal by treating it with a strong oxidizing agent.

solubility: solubility is the ability or tendency of one substance to blend uniformly with another.

sorbitivity: sorbitivity is the tendency of one substance to either adsorb or absorb another substance.

The following specific factors have been identified as the principle causes of limiting the operating life of sealed-off $CO_2$ lasers:
1. Gas leaks.
2. Optics damage.
3. Cathode disintegration.
4. $CO_2$ dissociation.
5. $O_2$ absorption.
6. Outgassing.

Appropriate structural design of the $CO_2$ laser has generally solved the gas leak problem. Optics damage is more severe in DC lasers due to the greater likelihood of sputter deposits and charged particle bombardment. In RF waveguide lasers the optics damage problem has been solved by appropriate selection of optical materials and design of the laser resonator. The cathode disintegration problem does not exist in RF lasers because of the cathodeless discharge but has been solved generally by means of copper oxide and silver oxide cathodes in DC lasers.

Stability with respect to dissociation of $CO_2$ molecules by electron impact given by the reaction:

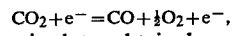
$$CO_2 + e^- = CO + \tfrac{1}{2}O_2 + e^-,$$

is required to obtain long sealed-off lifetime. In DC lasers this stability is achieved in part by catalyzing the reverse of the reaction near the electrodes by the proper choice of materials and in the laser bore by the addition of a small amount of hydrogen or water. However, even with these catalysts, the equilibrium dissociation level of $CO_2$ is in the neighborhood of 40-60%. In RF lasers, even without the deliberate introduction of a catalyst, the equilibrium dissociation level appears to be in the neighborhood of 10-20%. One way to ensure stable gas chemistry is to prevent the oxygen generated by the laser discharge from being consummed by either adsorption or oxidation. This is achieved in the present invention by ensuring that all surfaces with which the oxygen gas comes into contact, are suitably passivated. The present invention utilizes such passivation as an important step in the novel method of manufacturing RF-excited $CO_2$ waveguide lasers.

Conventional $CO_2$ lasers are housed in either ceramic or glass envelopes. However, RF-excited $CO_2$ waveguide lasers tend to be housed in metal envelopes which serve as a means for confining the gas and also as a shield against radio frequency interference. In order to minimize the cost of manufacturing RF waveguide lasers, the metal housing is preferably manufactured from extruded aluminum. However aluminum parts present a problem from the standpoint of bonding. Welding is not acceptable because of the high temperatures required and epoxies are not suitable because they do not form reliable, mechanically strong high temperature vacuum seals. Hence one must plate the aluminum with a oxidation resistant metal such as nickel and then soft-solder the nickel to bond the metal parts of the laser waveguide structure to one another. Although nickel is known to be very resistant to oxidation, it has been found that in the presence of $H_2O$, and particularly at temperatures exceeding 100 degrees centigrade, nickel oxidizes very rapidly. For a $CO_2$ laser, this oxidation can lead to a significant reduction in the amount of free oxygen and hence even greater $CO_2$ dissociation rates and shorter laser life.

The last one of the above-identified life limiting factors of $CO_2$ lasers is outgassing and principally, outgassing of hydrogen and water vapor. Applicants know of no specific prior art solution to the outgassing problem in RF excited waveguide lasers although there is a negative correlation between the amount of hydrogen and/or water vapor evolved and the output power of the laser.

A preferred economical structure for an RF waveguide laser, consists of a metal envelope usually plated and soldered as referred to above. The ceramic or ceramic-metal of the waveguide head is typically placed against the metal surface of an envelope for heat sinking purposes with a silicon heat sinking compound at the interface. Typically, the combination of materials including flux, silicone compounds, solder, metal oxides, and plated metals that make up the assembled waveguide and the requisite heat sinking which traps gases, result in an almost steady evolution of hydrogen and/or water vapor. The problem is exacerbated by the fact that a standard high vacuum bakeout at a temperature such as 400 degrees Centigrade is unsuitable for RF lasers because the solder seals, plated materials, the sputtered metal grid in the longitudinal tube of a longitudinal RF waveguide laser, and metal-ceramic sandwich commonly used in a transverse RF waveguide laser, cannot tolerate temperatures above about 130 degrees Centigrade. Accordingly, even after a pre-vacuum bakeout of the various materials comprising the waveguide, thorough washing to dissolve organic materials, minimizing the exposure to atmosphere during assembly, and a high vacuum bakeout at 130 degrees Centigrade for several weeks, there is still a steady evolution of hydrogen and/or water vapor.

A negative correlation has been observed between the measured outgassing rate at high temperatures and the life of the laser. Measurements on a residual gas analyzer have revealed that the primary outgassed products are water vapor and hydrogen. Furthermore, mass-spectrometer measurements of the laser gas after various laser run times have shown high correlation between the reduction of output power and the amount of hydrogen and water vapor. The deleterious effect of hydrogen and water vapor on the collision relaxation rate of the V-three level of $CO_2$, and hence the output power of $CO_2$ lasers, is well understood in laser physics.

The outgassing problem particularly in RF $CO_2$ waveguide lasers, has been solved by the applicants in the present invention by means of unique gettering. In the present invention getters have been designed which can adsorb the water vapor and/or hydrogen as quickly as they are evolved while leaving the laser gas constituents intact. It is interesting to note that it is generally thought desirable in the prior art to have small amounts of hydrogen and water vapor present in the standard $CO_2$ laser gas mix consisting of helium, nitrogen, and $CO_2$. Thus it will be observed that applicants' invention, while providing a means to reduce the hydrogen and water vapor content to as low a fraction as possible, runs counter to the generally accepted convention in the prior art regarding sealed-off $CO_2$ lasers.

SUMMARY OF THE INVENTION

The present invention comprises a method for manufacturing an RF excited $CO_2$ waveguide laser and the product thereof which substantially reduces or entirely overcomes the life limiting problems associated with $CO_2$ dissociation, $O_2$ adsorption, and $H_2$ and $H_2O$ outgassing. These problems are substantially alleviated in the present invention by utilizing a novel passivation technique to reduce the absorption of oxygen and to reduce the rate and likelihood of dissociation of $CO_2$; and by providing a suitable getter, namely, one which adsorbs essentially all of the hydrogen and/or water vapor at least as fast as they are evolved at the operating temperature of the laser, but one which does not adsorb or react with other gases. Ideally, this suitable getter should also be activated at relatively low temperatures, by way of example, about 150 degrees Centigrade. Most prior art getters, for example, activated charcoal, zirconium, and titanium and their alloys, are not entirely acceptable because of their high adsorbitivity or reactivity with oxygen and/or CO which would affect the stability of the gas chemistry of the $CO_2$ mixture. Other getter materials are not suitable because of the high temperatures required to activate them.

It is to be noted that as the laser discharge tends to dissociate water vapor into hydrogen and oxygen, hydrogen and oxygen readily combine outside the discharge. In addition, because there is a relative abundance of oxygen resulting from the discharge, the hydrogen and water vapor readily convert to one another. Accordingly, it is believed sufficient to utilize a getter which adsorbs either hydrogen or water vapor to ensure adequate adsorption of both.

In order for a material to be acceptable as a suitable getter it must have a high solubility with respect to hydrogen and/or water vapor at room temperatures and considerably less solubility at the laser bakeout temperatures which are approximately 100 degrees Centigrade. This characteristic ensures that the previously adsorbed hydrogen and/or water vapor is evolved from the getter and that the getter does not adsorb hydrogen or water vapor gas which is evolved from other sources.

In the present invention two suitable getters have been discovered, one primarily for adsorption of hydrogen and one primarily for adsorption of water vapor, both of which have the aforementioned characteristics essential for a suitable getter for the above-indicated purpose.

OBJECTS OF THE INVENTION

It is thus a primary object of the present invention to provide a novel method for manufacturing sealed-off RF excited $CO_2$ waveguide lasers which substantially increases laser operating life by ensuring a stable gas chemistry.

It is still a further object of the present invention to provide a novel passivation technique for nickel-plated aluminum structural components of an RF excited $CO_2$ waveguide laser.

It is an additional object of the present invention to improve the life of a sealed-off RF excited $CO_2$ waveguide laser by providing a getter with high adsorptivity to hydrogen at room temperatures with adsorptivity which decreases with increasing temperature.

It is an additional object of the present invention to provide improved operation life of a sealed-off RF excited $CO_2$ waveguide laser by utilizing a getter with a high adsorptivity to water vapor at room temperatures which rapidly decreases with increasing temperature.

DETAILED DESCRIPTION OF PREFERRED EMBODIMENTS

The present invention increases the life of sealed-off $CO_2$ lasers, particularly RF excited $CO_2$ waveguide lasers, by advantageously affecting three of the life limiting factors of such lasers, all of which factors relate to the stability of the gas chemistry. These factors include $CO_2$ dissociation, $O_2$ adsorption, and $H_2$ and $H_2O$ outgassing. The invention relates to passivation and gettering steps taken preferably during and subsequent to assembly of the waveguide.

In a typical RF excited $CO_2$ waveguide laser, a metal envelope is provided as the housing of the RF waveguide assembly to serve as a means for confining the gas as well as a means for providing a radio frequency interference shield. In addition, the metal envelope provides a means for overcoming the difficulties associated with sealing of the metal-ceramic structure of the waveguide tube per se. Cost factors make it preferable to utilize aluminum for the metal envelope. However, aluminum presents unique problems associated with bonding the metal parts together to form the housing. For example, welding is not acceptable because of the high temperatures involved and epoxies are unsuitable because they do not form high temperature reliable mechanically strong vacuum seals. Hence, applicants have found it preferable to nickel plate the aluminum and then soft solder the nickel surfaces to bond the metal. Although nickel is ordinarily resistant to oxidation, it has been found that in the presence of water vapor, and particularly at temperatures higher than approximately 100 degrees Centigrade, nickel oxidizes rapidly and as those skilled in the art to which the present invention pertains will understand, oxidation disturbs the gas chemistry of a $CO_2$ laser by reducing the amount of free oxygen thus increasing the $CO_2$ dissociation rate.

The present invention utilizes an effective passivation technique that creates a porous black nickel oxide coating on the plated aluminum portions of the housing. The passivation technique consists of dipping individual nickel-plated aluminum parts into a passivation solution consisting of concentrated nitric acid for ten to sixty seconds at room temperature. Then the parts are baked at 350 degrees Fahrenheit for about 3 hours in air. Then the waveguide's nickel-plated aluminum structural components are vacuum baked to remove water vapor, hydrogen, and organic materials. Typically, this vacuum bake process is conducted at temperatures at or exceeding 100 degrees Centigrade at a pressure of less than one Torr for a period of at least 72 hours. After the waveguide structure is fully assembled and soldered, it is washed in a series of solvents and vacuum baked for at least fourteen days.

In addition to increasing the life of sealed-off RF excited $CO_2$ waveguide lasers, the novel passivation steps of the present invention provide much higher production rates by precluding the need for lengthy burn-in processes previously required. Previous techniques without the passivation steps described above, require that the lasers be filled dozens of times under high temperature "burn in" conditions, which uses at least one week of process time. The passivation steps of the present invention provide a stable gas chemistry with only one or two fillings of the laser with the gas mixture. Accordingly, in addition to increasing the operating life of the laser, the passivation technique described above also substantially decreases the production costs associated with such lasers.

THE HYDROGEN GETTER

As previously indicated a suitable getter for hydrogen must have a high solubility of hydrogen at room temperatures and considerably less solubility at the laser bakeout temperatures of 100 degrees Centigrade and higher. The hydrogen solubility of metals in chemical group A, namely, nickel, iron, etcetera, increases with increasing temperature. Hence metals in this group would be unsuitable as getters for this purpose. However, metals in group B, namely, titanium, palladium, etcetera, have solubility characteristics which decrease with increasing temperature. In addition, the solubility of hydrogen on metals of group B is between $10^3$ and $10^4$ times greater than the metals in group A. Of the metals in group B, palladium has the preferred characteristics as a suitable getter for hydrogen in a $CO_2$ laser. Alternatively, other group B metals such as vanadium are also suitable. Palladium in powdered form and baked out at at least 150 degrees Centigrade at a vacuum of at least $10^{-4}$ Torr for about 12 hours, has a high sorbitivity with respect to hydrogen, a large sorbitivity decrease between room temperature and 130 degrees Centigrade, and high hydrogen diffusivity to allow bulk sorbitivity. Typically, from 1 to 10 grams of black palladium powder are placed in a cylindrical container of approximately 1 inch in diameter and 1 inch in height. This container is then placed in a position which renders the palladium powder accessible to the gas such as between the filling valve and the remainder of the waveguide assembly.

THE WATER VAPOR GETTER

Like the hydrogen getter, a suitable getter for water vapor must be both highly adsorbent to water vapor and have a sorbitivity characteristic which decreases rapidly with increasing temperature. The applicants have selected a substance not previously known for use as a getter, namely, cellulose which the applicants have found may be suitably degassed of water vapor at about 100 degrees Centigrade and at least $10^{-4}$ Torr for about 12 hours to act as a getter at room temperature. Indeed applicants have found that even with a laser which has apparently ceased to operate because of outgassing, insertion of a cellulose getter without refilling the gas, immediately restored the laser to full power. In one preferred embodiment of the invention, an effective cellulose product is commercial grade toilet paper. The cellulose may also be placed in any suitable container and located in a position to which the $CO_2$ gas mixture has access as in the above indicated position for the $H_2$ getter.

SUMMARY

It will now be understood that what has been disclosed herein comprises a novel method for manufacturing sealed-off RF excited $CO_2$ waveguide lasers, which substantially increases laser operating life by ensuring a stable gas chemistry; and the resulting laser apparatus. In one embodiment the method includes a novel passivation technique for oxidizing the surface of nickel-plated aluminum structural components of the waveguide laser. In other embodiments one or more gettering materials are provided having high absorptivity to hydrogen and/or water vapor at room temperatures, which absorptivity decreases with increasing temperatures. In still additional embodiments the aforementioned passivation technique and gettering are combined to provide extended-life, sealed-off, RF excited $CO_2$ waveguide lasers by substantially alleviating the life-limiting factors associated with $CO_2$ dissociation, $O_2$ absorption and $H_2O$ and $H_2$ outgassing. The invention also comprises RF excited $CO_2$ waveguide lasers which incorporate passivated nickel-plated aluminum structures, as well as one or both of the above indicated gettering materials utilized in the above indicated manufacturing process.

It will be clear to those having skill in the art to which the present invention pertains that modifications may be made to the present invention. By way of example, there may be alternative techniques for passivating the metal structure of the waveguide assembly and there may also be alternative materials that may be used for gettering the hydrogen and/or water vapor other than those disclosed herein. However, it will be clear that all such alternatives and modifications are contemplated to be within the scope of the invention which is to be limited only by the appended claims.

We claim:

1. A method of constructing a sealed-off RF excited $CO_2$ waveguide laser comprising the steps of:
   selecting aluminum structural members suitable for construction of a waveguide laser housing,
   nickel-plating said aluminum structural members,
   placing said structural members in a passivation solution until all exposed surfaces are covered by an oxidized coating, and
   subjecting said structural members to a temperature of at least 100 degrees Centigrade and a vacuum of at least $10^{-4}$ Torr for a period of at least 72 hours.

2. The method defined in claim 1 wherein said passivation solution consists of nitric acid.

3. The method defined in claim 2 wherein in said placing step said structural members remain in said solution for approximately 10 to approximately 60 seconds.

4. The method defined in claim 1 comprising the following additional steps:
   assembling said laser waveguide including said housing, and
   subjecting said assembled laser waveguide including said housing to a temperature of at least 100 degrees Centigrade and a vacuum of at least $10^{-4}$ Torr for a period of at least 72 hours.

5. A method of constructing a sealed-off RF excited $CO_2$ waveguide laser comprising the steps of:
   assembling said laser,
   preparing from 1 to 10 grams of cellulose,
   outgassing said cellulose by subjecting it to a temperature of at least 100 degrees Centigrade and a vacuum of at least $10^{-4}$ Torr for a period of about 12 hours, and
   installing said cellulose in a container located within said assembled laser at a location to which the laser gas has access.

6. A method of constructing a sealed-off RF excited $CO_2$ waveguide laser comprising the steps of:
   selecting aluminum structural members suitable for construction of a waveguide laser housing,
   nickel-plating said aluminum structural members,
   placing said structural members in a passivation solution until all exposed surfaces are covered by an oxidized coating,
   subjecting said structural members to a temperature of at least 100 degrees Centigrade and a vacuum of at least $10^{-4}$ Torr for a period of at least 72 hours,
   assembling said laser waveguide including said housing,
   subjecting said assembled laser waveguide including said housing to a temperature of at least 100 degrees Centigrade and a vacuum of at least $10^{-4}$ Torr for a period of at least 72 hours,
   preparing from 1 to 10 grams of cellulose,
   outgassing said cellulose by subjecting it to a temperature of at least 100 degrees Centigrade and a vacuum of at least $10^{-4}$ Torr for a period of about 12 hours, and
   installing said cellulose in a container located within said assembled laser at a location to which the laser gas has access.

7. The method defined in claim 6 wherein said passivation solution consists of nitric acid.

8. The method defined in claim 7 wherein in said placing step said structural members remain in a 50% concentration of said solution for approximately 10 to 60 seconds.

9. A sealed-off RF excited $CO_2$ waveguide laser including a gettering substance in contact with the gas mixture contained within said laser, said substance having high sorbitivity to hydrogen gas at room temperature and decreasing sorbitivity to hydrogen gas with increasing temperature, further comprising a housing consisting of nickel-plated aluminum members, the surfaces thereof being passivated with a nickel oxide coating.

10. In an assembled sealed-off RF excited $CO_2$ waveguide laser of the type having a gas mixture contained within said laser the improvement comprising cellulose contained within said assembled laser in contact with the gas mixture, said cellulose specially prepared to ensure high sorbitivity to water vapor at room temperature and decreasing sorbitivity to water vapor with increasing temperature to absorb water vapor evolved by the gas mixture.

11. A sealed-off RF excited $CO_2$ waveguide laser including a gettering substance in contact with the gas mixture, said gettering substance having high sorbitivity to water vapor at room temperature and decreasing sorbitivity to water vapor with increasing temperature, further comprising a housing of nickel-plated aluminum members, the surfaces thereof being passivated with a nickel oxide coating.

* * * * *